United States Patent
Clark et al.

(10) Patent No.: US 11,205,333 B2
(45) Date of Patent: Dec. 21, 2021

(54) SENSORY FEEDBACK

(71) Applicant: HEWLETT-PACKARD DEVELOPMENT COMPANY, L.P., Houston, TX (US)

(72) Inventors: Alexander Wayne Clark, Houston, TX (US); Michael C. Bartha, Houston, TX (US); Brandon James Lee Haist, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 721 days.

(21) Appl. No.: 16/075,896

(22) PCT Filed: Jun. 21, 2017

(86) PCT No.: PCT/US2017/038485
§ 371 (c)(1),
(2) Date: Aug. 6, 2018

(87) PCT Pub. No.: WO2018/236367
PCT Pub. Date: Dec. 27, 2018

(65) Prior Publication Data
US 2021/0209919 A1    Jul. 8, 2021

(51) Int. Cl.
*G08B 21/00* (2006.01)
*G08B 21/02* (2006.01)
(Continued)

(52) U.S. Cl.
CPC ......... *G08B 21/0261* (2013.01); *G06F 3/012* (2013.01); *G06F 3/016* (2013.01); *G06F 3/167* (2013.01)

(58) Field of Classification Search
CPC ..... G08B 21/0261; G06F 3/012; G06F 3/167; G06F 3/016
(Continued)

(56) References Cited

U.S. PATENT DOCUMENTS 9,552,676 B2    1/2017  Wong et al.
2013/0286004 A1  10/2013  Mcculloch et al.
(Continued)

FOREIGN PATENT DOCUMENTS

WO    2016073783 A1    5/2016

OTHER PUBLICATIONS

Chen et al., "SoEs: Attachable Augmented Haptic on Gaming Controller for Immersive Interaction", Retrieved from Internet—https://dl.acm.org/citation.cfm?id=2985707, 2016, 2 Pages.

*Primary Examiner* — Tanmay K Shah
(74) *Attorney, Agent, or Firm* — Brooks Cameron & Huebsch PLLC

(57) ABSTRACT

Example implementations relate to sensory feedback. For example, a non-transitory machine-readable medium storing instructions executable by a processing resource of a parent device to cause the parent device to provide primary sensory feedback, transmit a notification message from the parent device to a child device to cause the child device to provide secondary sensory feedback in response to receipt of the notification message, where the notification message includes instructions to provide secondary sensory feedback synchronized with the primary sensory feedback.

12 Claims, 7 Drawing Sheets

(51) Int. Cl.
*G06F 3/01* (2006.01)
*G06F 3/16* (2006.01)
(58) Field of Classification Search
USPC ...................................................... 340/686.1
See application file for complete search history.

(56) References Cited

U.S. PATENT DOCUMENTS

| | | |
|---|---|---|
| 2013/0335301 A1 | 12/2013 | Wong et al. |
| 2015/0145656 A1 | 5/2015 | Levesque et al. |
| 2015/0227204 A1 | 8/2015 | Gipson et al. |
| 2016/0124502 A1* | 5/2016 | Sawyer ............... G02B 27/017 345/633 |
| 2016/0152184 A1 | 6/2016 | Ogawa et al. |
| 2016/0171771 A1 | 6/2016 | Walter et al. |
| 2017/0011602 A1 | 1/2017 | Brav et al. |

* cited by examiner

SENSORY FEEDBACK

BACKGROUND

Virtual reality (VR) is a form of computer generated environment (i.e., a virtual world) with which a user can interact in ways that may be similar to or different from the ways that the user interacts with the physical environment. A VR system produces video images that present the virtual world to the system user.

DETAILED DESCRIPTION

Virtual reality (VR) systems allow a user to interact with an environment that is unavailable to the user in the physical world. One goal of VR systems is to provide the user with an experience that is a close analog to the user's experience and interaction with the physical world. To achieve a convincing experience, the VR system visually isolates the user from the physical environment by blocking the user's vision with respect to the physical environment. Some systems may further enhance experience of the virtual world by isolating the user's hearing to the virtual world. Thus, the user's experience in VR may be limited to the video and audio signals generated by the VR system. While such visual and auditory isolation may enhance the user's experience in the virtual world, the user remains subject to forces present in the physical world.

Because the user of a VR system may be sensorially isolated from the physical environment, the user may be vulnerable, or feel vulnerable, to conditions present in the physical environment. For instance, being sensorially isolated from the physical environment may lead the user to accidentally harming themselves on surrounding obstacles when they leave a safely designated boundary. The inability to see one's surroundings may be a danger to the user, the VR equipment, and the surroundings.

A device VR system may offer sensory feedback to the user by providing a notification to the user that certain events, such as approaching a designated boundary, have been triggered. However, a singular sensory feedback provided to the user is often not enough to warn them about leaving the safely defined boundaries of their environment.

Accordingly, the disclosure is directed to sensory feedback. Desirably, sensory feedback systems disclosed herein monitor and coordinate sensory feedback across sensory feedback devices such as a parent device and a child device to provide a user with greater awareness certain event such as approaching a designated boundary. Specifically, the sensory feedback system disclosed herein may apprise the VR user that they are leaving a VR environment and risking harming themselves, their equipment, and the environment surrounding them, including other people.

Figure 1:
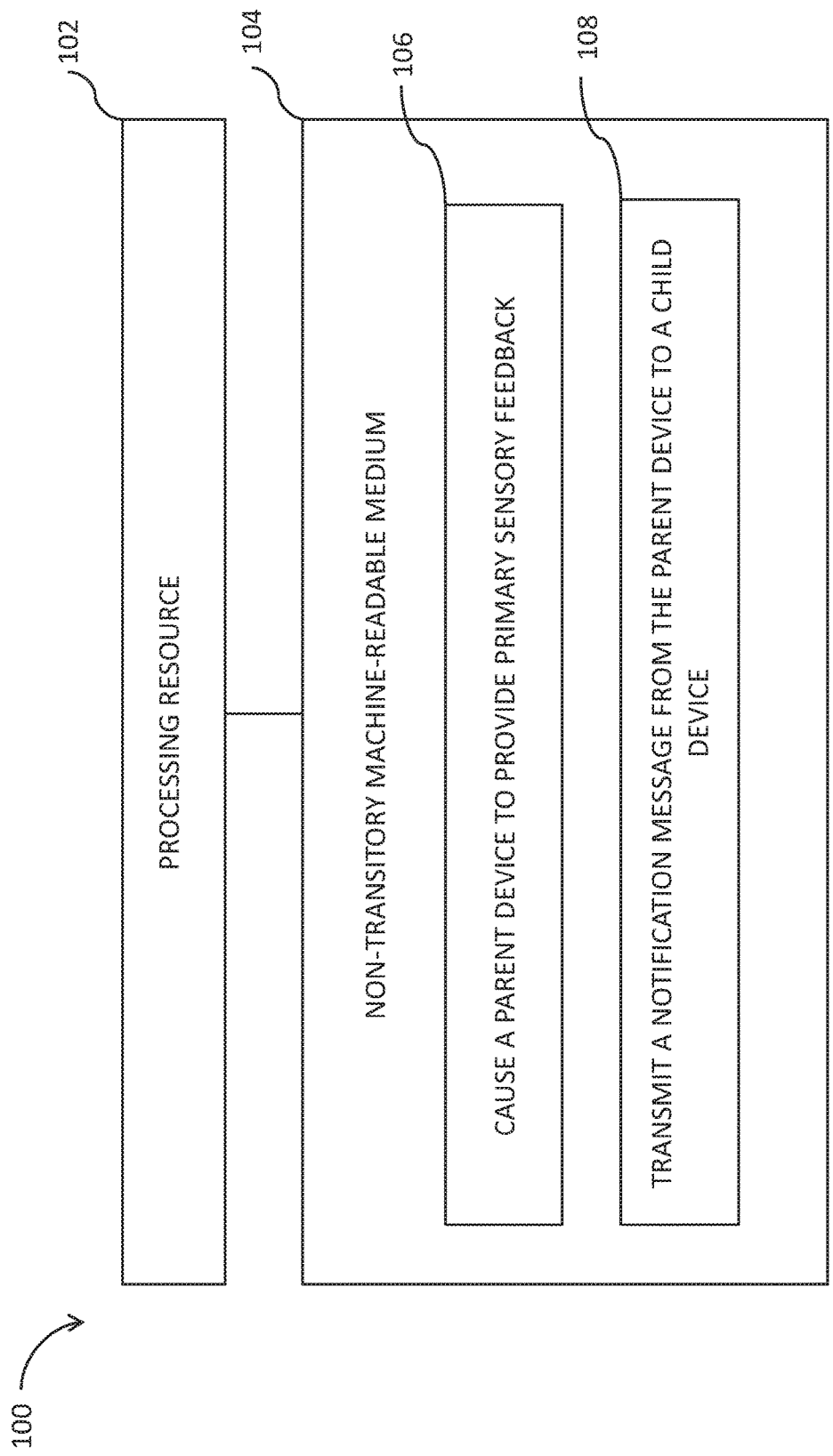
FIG. 1 illustrates a diagram of an example of a non-transitory computer readable medium and processing resource for sensory feedback consistent with the disclosure.

FIG. 1 illustrates a diagram 100 of an example of a non-transitory computer readable medium 104 and processing resource 102 for sensory feedback consistent with the disclosure. In some examples, the processing resource 102 may process and/or control data received from inputs of an apparatus. A memory resource can be used to store instructions executed by the processing resource 102 to perform operations as described herein. A processing resource 102 may execute instructions stored on the non-transitory machine readable medium 104. The non-transitory machine readable medium 104 may be any type of volatile or non-volatile memory or storage, such as random access memory (RAM), flash memory, read-only memory (ROM), storage volumes, a hard disk, or combinations thereof.

The example medium 100 may store instructions 106 executable by a processing resource 102 of a parent device to cause the parent device to provide primary sensory feedback. A parent device may be a sensory feedback device capable of providing sensory feedback to a VR user. For example, sensory feedback devices may include phones, smart watches, clothing, game controllers, UR controllers, UR headsets, augmented reality headsets, communication headsets, audio headphones, Bluetooth earpieces, etc.

In some examples, a plurality of sensory feedback devices may be connected via a software layer. The plurality of sensory feedback devices may be coupled via a mesh network, allowing the software layer to communicate to the plurality of sensory feedback devices and send the VR user a single, coordinated sensory feedback signal. A sensory feedback device may be designated to be the parent device, while each remaining sensory device may be classified as a child device. As described herein, the parent device may transmit a notification message to an individual child device or a plurality of child devices. In some examples, in the case of Bluetooth coupling, each of the plurality of child devices may couple to the designated parent device and may use the Bluetooth sideband and BLE to transmit and receive notification messages. In some examples, the software layer can be connected via the local network, transmitting instructions through the router directly via a cloud network connection.

The example medium 100 may store instructions 106 executable by a processing resource 102 to detect when a VR headset is within a threshold distance of a designated boundary. In some examples, a parent device may be a computer device running a UR application. For example, a parent device may be a VR headset. As described herein, a parent device may include a transceiver to receive and/or transmit notification messages. The transceiver may receive a notification message from a device which tracks the position of the parent and/or child device. For example, mounted sensors on a wall may track the position of the parent and/or child device. Upon detection the parent and/or child device is within the threshold distance of the designated boundary, the sensor may transmit a notification message to the parent device. The notification message may include instructions for the parent device to provide primary sensory feedback.

The designated boundary may be a virtual boundary. For example, the designated boundary may be a virtual boundary determined by physical features of the real world, such as an open area in a room. The boundary can be a rectangular shape, determined by open space that the user has in an area and may be designated by the user, during setup of the virtual boundary, to be an area that is clear of physical objects, such as furniture.

In some examples, the parent device may comprise a sensory feedback mechanism to provide primary sensory feedback to a VR user. The primary sensory feedback may include visual feedback, audible feedback, haptic feedback, or combinations thereof. For example, the sensory feedback mechanism may provide the VR user with various intensities of sensory feedback based on the VR user's distance from the designated boundary. For example, the amplitude of the haptic feedback may be increased/decreased with the relative distance between or proximity of potentially threatening objects. As such, in one example, as the VR user approaches the designated boundary the sensory feedback may increase in frequency and amplitude. Conversely, should the VR user take action to avoid the designated boundary (e.g., by slowing down, changing direction, etc.) the sensory feedback warning may decrease in frequency and amplitude.

In some examples, the parent device may include a speaker (e.g., external speaker, head phones, ear buds, etc.) to provide audible feedback (e.g., an audible warning or notification, etc.) to a user. The pitch, volume, tone, frequency, and other characteristics of an audible warning/notification may be varied to provide indications of the location of the VR user in relation to the designated boundary.

In some examples, the parent device may include elements, such as a light to provide visual warnings or notifications to the VR user. For example, a light (e.g., LEDs, etc.) may be provided within a VR headset (e.g., to the peripheral side of each eye, etc.). Brightness, a color, a blinking frequency, or other characteristic of the light may be varied to provide indications of the location of the VR user in relation to the designated boundary.

In some examples, the parent device may provide primary sensory feedback to the VR user as a result of detecting the VR user is within a threshold distance of a designated boundary. The threshold distance can be a pre-determined distance from the designated boundary which is deemed safe via user testing. In some examples, the parent device may receive a notification message from a device tracking the position of the VR user by tracking the parent device and/or child device. The device may detect the UR user is within the threshold distance of the designated boundary and notify the parent device. In some examples, the parent device may track the position of the VR user and detect the VR user is within the threshold distance of the designated boundary In some examples. In some examples, the child device may track the position of the UR user and upon detecting the UR user is within the threshold distance of the designated boundary, notify the parent device via a notification message.

In some examples, the parent device may provide primary sensory feedback to the VR user as a result of detecting objects with which the VR user may collide. The parent device, the child device, or a separate device may detect objects with which the VR user may collide. For example, objects that move in the physical environment proximate to the VR user may be invisible to the VR user and collision between the object and the user may occur. Such objects may include other users of the VR system, human beings or animals generally, and other objects subject to change of proximity to the user caused by movement of the user or movement of the object. For example, upon detection of a parent and/or a child device being within a threshold distance of a designated boundary and/or an object with which the UR user may collide, the VR user may be alerted via visual feedback, audible feedback, haptic feedback, or combinations thereof.

The example medium 100 may store instructions 108 executable by a processing resource 102 to transmit a notification message from the parent device to a child device to cause the child device to provide secondary sensory feedback in response to receipt of the notification message, where the notification message includes instructions to provide secondary sensory feedback synchronized with the primary sensory feedback. As described herein, the parent device may include a transceiver to transmit a notification message.

The parent device may transmit the notification message in response to detecting the parent device and/or a child device is within a threshold distance of a designated boundary and/or an object with which the VR user may collide. For example, the parent device may detect the parent device or the child device worn by the VR user has breached the designated boundary. For example, the parent device and the child device may include phones, smart watches, clothing, game controllers, VR controllers, VR headsets, augmented reality headsets, communication headsets, audio headphones, Bluetooth earpieces, etc.

In some examples, the parent device may be coupled to a single child device or a plurality of child devices allowing for a multi-device sensory feedback system. Upon detection of the parent device and/or the child device being within the threshold distance of the designated boundary and/or an object with which the VR user may collide, the parent device may transmit a notification message to the individual or the plurality of child devices via a transceiver.

In some examples, the child device may comprise a transceiver to receive the notification message from the parent device. The notification message may include instructions to provide secondary sensory feedback to the VR user. For example, the child device may comprise a sensory feedback mechanism to provide secondary sensory feedback. The child device may provide secondary sensory feedback to the VR user in response to receipt of the notification message received from the parent device. For example, upon receipt of the notification message received from the parent device notifying the child device of the parent and/or the child device being within the threshold distance of the designated boundary and/or an object with which the VR user may collide, the VR user may be alerted via secondary sensory feedback. For example, the VR user may be alerted via visual feedback, audible feedback, haptic feedback, or combinations thereof.

In some examples, the secondary sensory feedback provided by the child device may be synchronized with the primary sensory feedback provided by the parent device. The synchronized feedback may include the primary sensory feedback provided at the same time as the secondary sensory feedback. For example, the synchronized feedback may include primary sensory feedback provided by the parent device at the same time as the secondary sensory feedback is provided by the child device by delaying initiation of the primary sensory feedback to coincide with an expected initiation of the secondary sensory feedback.

In some examples, a child device may be coupled to a plurality of child devices. For example, a VR user may wear a plurality of sensory feedback devices. As described herein a single sensory feedback device may be designated as the parent device and each individual sensory feedback device not designated as the parent device may be designated as child devices. The plurality of child devices may be coupled to the parent device. For example, the parent device may communicate via a transceiver to each of the plurality of child devices.

In some examples, the parent device may transmit a notification message to the plurality of child devices. For example, upon receipt of the notification message received from the parent device notifying the plurality of child devices of a parent and/or a child device being within a threshold distance of a designated boundary and/or an object with which the VR user may collide, the VR user may be alerted via secondary sensory feedback. For example, the plurality of child devices may alert the VR user via visual feedback, audible feedback, haptic feedback, or combinations thereof.

In some examples, the secondary sensory feedback provided by the plurality of child devices may be synchronized. For example, the synchronized feedback may include the secondary sensory feedback provided by each of the plurality of child devices at the same time. For example, the synchronized feedback may include the secondary sensory feedback is provided by a first child device at the same time as the secondary sensory feedback is provided by a second child device.

In some examples, the secondary sensory feedback provided by the plurality of child devices may be synchronized with the primary sensory feedback provided by the parent device. For example, the synchronized feedback may include the primary sensory feedback provided at the same time as the secondary sensory feedback. For example, the synchronized feedback may include primary sensory feedback provided by the parent device at the same time as the secondary sensory feedback provided by the plurality of child devices by delaying initiation of the primary sensory feedback to coincide with an expected initiation of the secondary sensory feedback.

In some examples, a magnitude of the primary sensory feedback and a magnitude of the secondary sensory feedback may be proportional to the VR user's distance from a designated boundary. For example, the magnitude of the primary sensory feedback and the secondary sensory feedback may be proportional to the parent and/or the child device's distance from the designated boundary. The sensory feedback mechanism may vary the frequency, amplitude, and/or waveform of vibrations of the haptic feedback. For example, the sensory feedback mechanism of the parent device and the child device may provide the VR user with various intensities of sensory feedback based on the VR user's distance from the designated boundary. For example, the amplitude of the haptic feedback may be increased/decreased with the relative distance between or proximity of potentially threatening objects. As such, in one example, as the VR user approaches the designated boundary the sensory feedback may increase in frequency and amplitude. Conversely, should the VR user take action to avoid the designated boundary (e.g., by slowing down, changing direction, etc.) the sensory feedback warning may decrease in frequency and amplitude.

In some examples, the parent device and/or the child device may include a speaker (e.g., external speaker, head phones, ear buds, etc.) to provide audible feedback (e.g., an audible warning or notification, etc.) to the VR user. The pitch, volume, tone, frequency, and other characteristics of an audible warning/notification may be varied to provide indications of the location of the VR user in relation to the designated boundary.

In some examples, the parent device and/or the child device may include elements, such as a light, to provide visual warnings or notifications to the VR user. For example, a light (e.g., LEDs, etc.) may be provided within a VR headset (e.g., to the peripheral side of each eye, etc.). Brightness, a color, a blinking frequency, or other characteristic of the light may be varied to provide indications of the location of the VR user in relation to the designated boundary. In some examples, the VR headset may provide a visual warning through the headset display, overlaying content, boundary indicators, and warning messages into the digital content being shown on the embedded screen.

In some examples, the parent device and/or the child device may provide two-dimensional information (e.g., left, right, front, back, etc.) to a VR user regarding the position of the VR user in relation to the designated boundary. For example, upon detection of the parent device and/or a child device being within a threshold distance of a designated boundary and/or an object with which the VR user may collide, the parent device may provide primary sensory feedback to the portion of the VR user that is within the designated boundary and/or the colliding object.

In some examples, upon detection of the parent device and/or a child device being within the threshold distance of the designated boundary and/or an object with which the VR user may collide, the parent device may transmit a notification message to an individual or a plurality of child devices located on the portion of the VR user that is within the designated boundary and/or the colliding object.

For example, if the designated boundary is to the left of the VR user, the parent device and/or the child device may provide sensory feedback via the parent device and/or the child device to the left portion of the VR user (e.g., left of head, left of neck, left leg, left arm, etc.) to make the VR user aware of the unseen designated boundary to the left of VR user. In some examples, the parent and/or the child device may provide visual feedback via visual elements, such as flashing a light in the users peripheral vision (e.g., on the side the designated boundary is located, etc.) or emitting an audible tone in an ear corresponding to a location of the designated boundary with respect to the VR user (e.g., emitting an audible tone in the right ear of a user when a designated boundary is located somewhere on the right side of the users view of the virtual environment, etc.).

In some examples, the secondary sensory feedback provided by an individual child device or a plurality of child devices located on a portion of the body corresponding to the location of the designated boundary may be synchronized with the primary sensory feedback provided by the parent device. For example, the synchronized feedback may include primary sensory feedback provided by the parent device at the same time as secondary sensory feedback is provided by individual child device or a plurality of child devices located on a portion of the body corresponding to the location of the designated boundary by delaying initiation of the primary sensory feedback to coincide with an expected initiation of the secondary sensory feedback.

Figure 2:
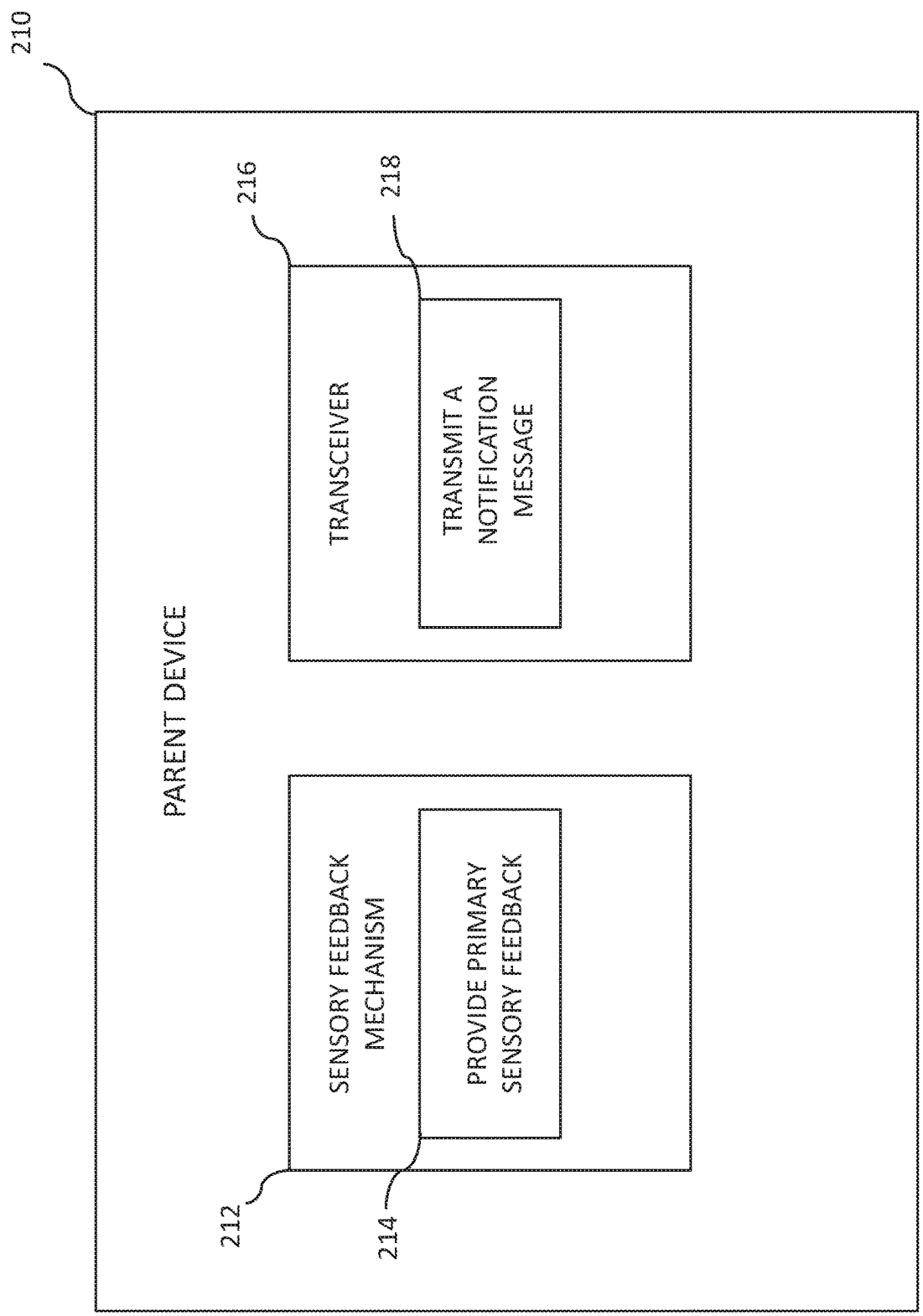
FIG. 2 illustrates an example of a parent device consistent with the disclosure.
Figure 3:
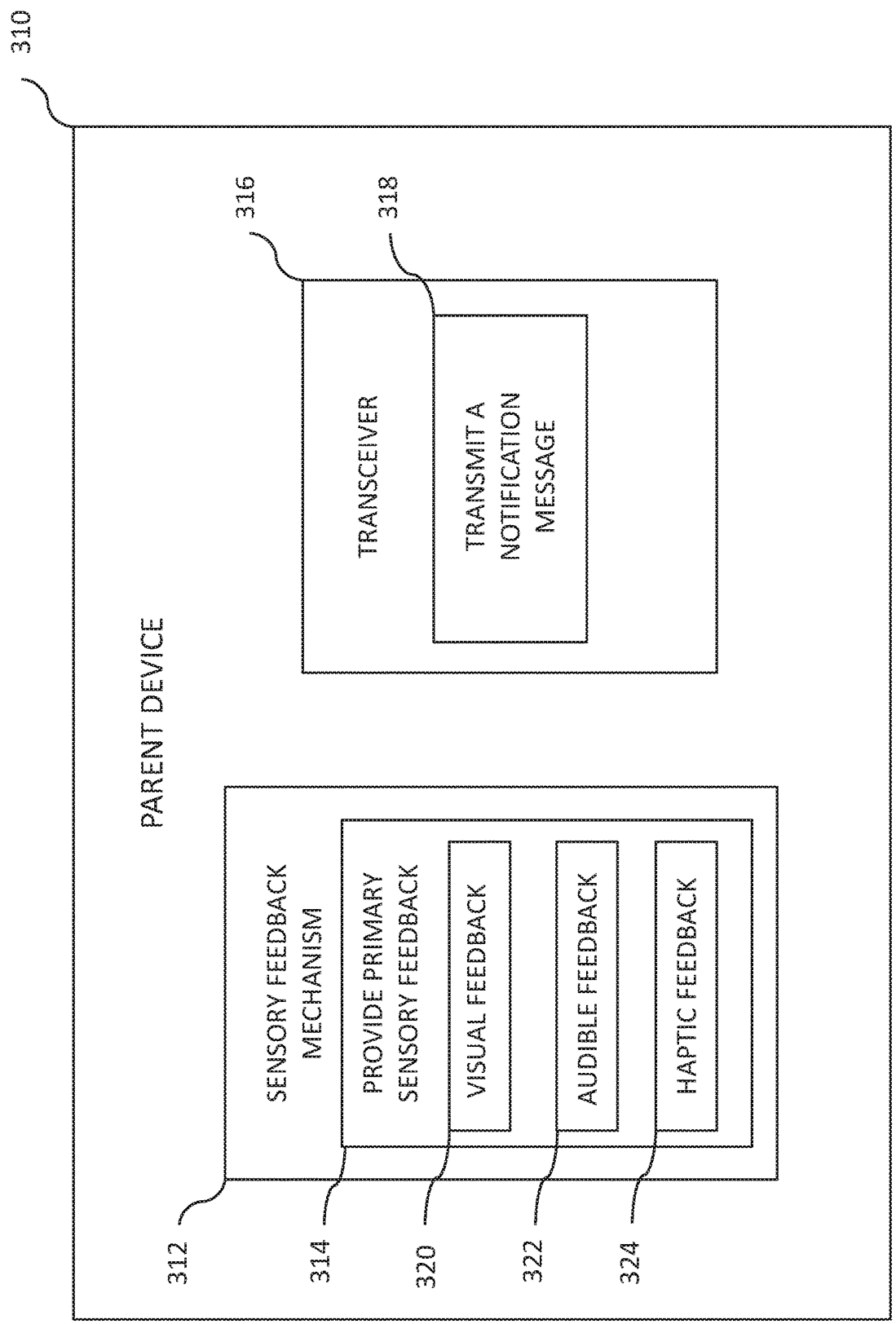
FIG. 3 illustrates an example of a parent device consistent with the disclosure.

FIGS. 2-3 illustrate an example of a parent device 210, 310 in accordance with various examples. Parent device 210, 310 may include smart watches, clothing, game controllers, phones, VR controllers, audio headphones, headsets, or combinations thereof. As described herein, a parent device 210, 310 may comprise a sensory feedback mechanism 212, 312 to provide primary sensory feedback 214, 314. For example, the primary sensory feedback may include visual feedback 320, audible feedback 322, haptic feedback 324, or combinations thereof.

As described herein, parent device 210, 310 may comprise transceiver 216, 316 to transmit a notification message 218, 318 from parent device 210, 310 to a child device to cause the child device to provide secondary sensory feedback in response to receipt of the notification message. The notification message may include instructions to provide secondary sensory feedback synchronized with the primary sensory feedback.

Figure 4:
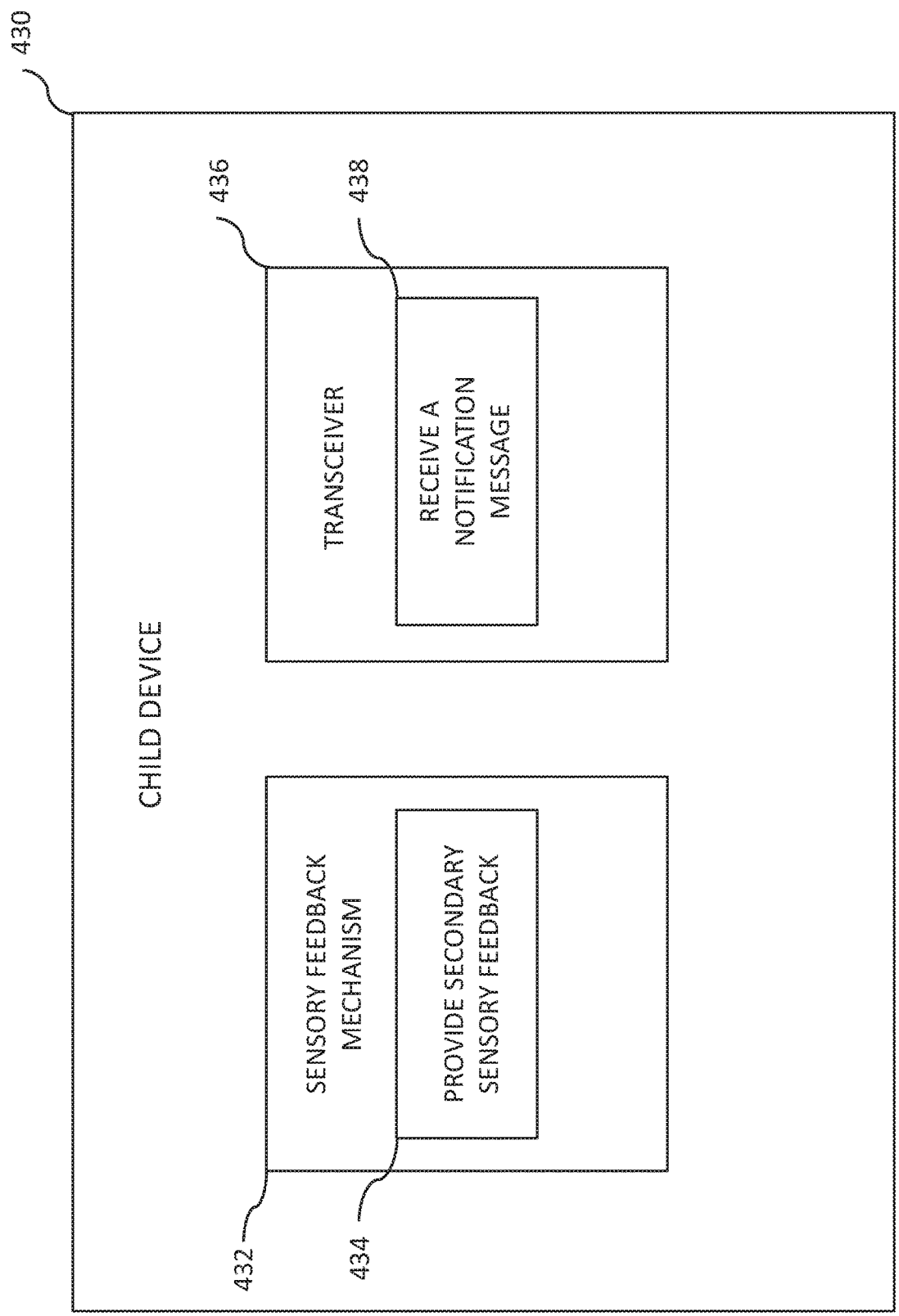
FIG. 4 illustrates an example of a child device consistent with the disclosure.
Figure 5:
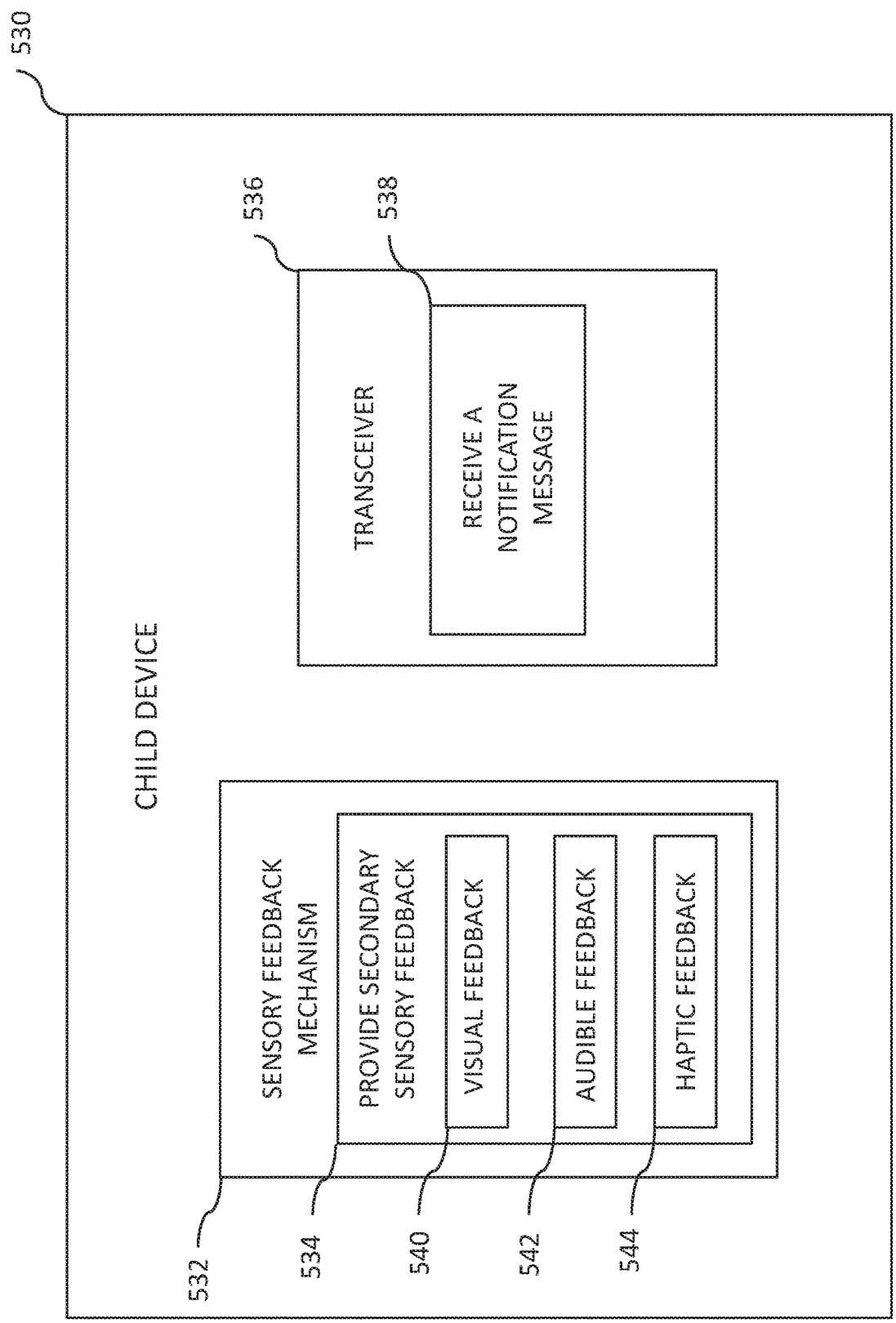
FIG. 5 illustrates an example of a child device consistent with the disclosure.

FIGS. 4-5 illustrate an example of child device 430, 530 in accordance with various examples. Child device 430, 530 may include smart watches, clothing, game controllers, phones, VR controllers, audio headphones, headsets, or combinations thereof. As described herein, child device 430, 530 may comprise transceiver 436, 536 to receive a notification message 438, 538 from a parent device, where the notification message may include instructions to provide secondary sensory feedback.

As described herein, child device 430, 530 may comprise sensory feedback mechanism 432, 532 to provide secondary sensory feedback 434, 534 in response to receipt of the notification message from the parent device. Secondary sensory feedback may include visual feedback 540, audible feedback 542, haptic feedback 544, or combinations thereof. As described herein, the secondary sensory feedback may be synchronized with the primary sensory feedback. For example, the notification message may include instructions to provide a propagation delay between initiation of the primary sensory feedback and the secondary sensory feedback. The propagation delay may be a length of time it takes for the notification message to travel from the parent device to the child device. Providing a propagation delay between the primary sensory feedback and the secondary sensory feedback may result in a delayed initiation of the primary sensory feedback to coincide with an expected initiation of the secondary sensory feedback.

Figure 6:
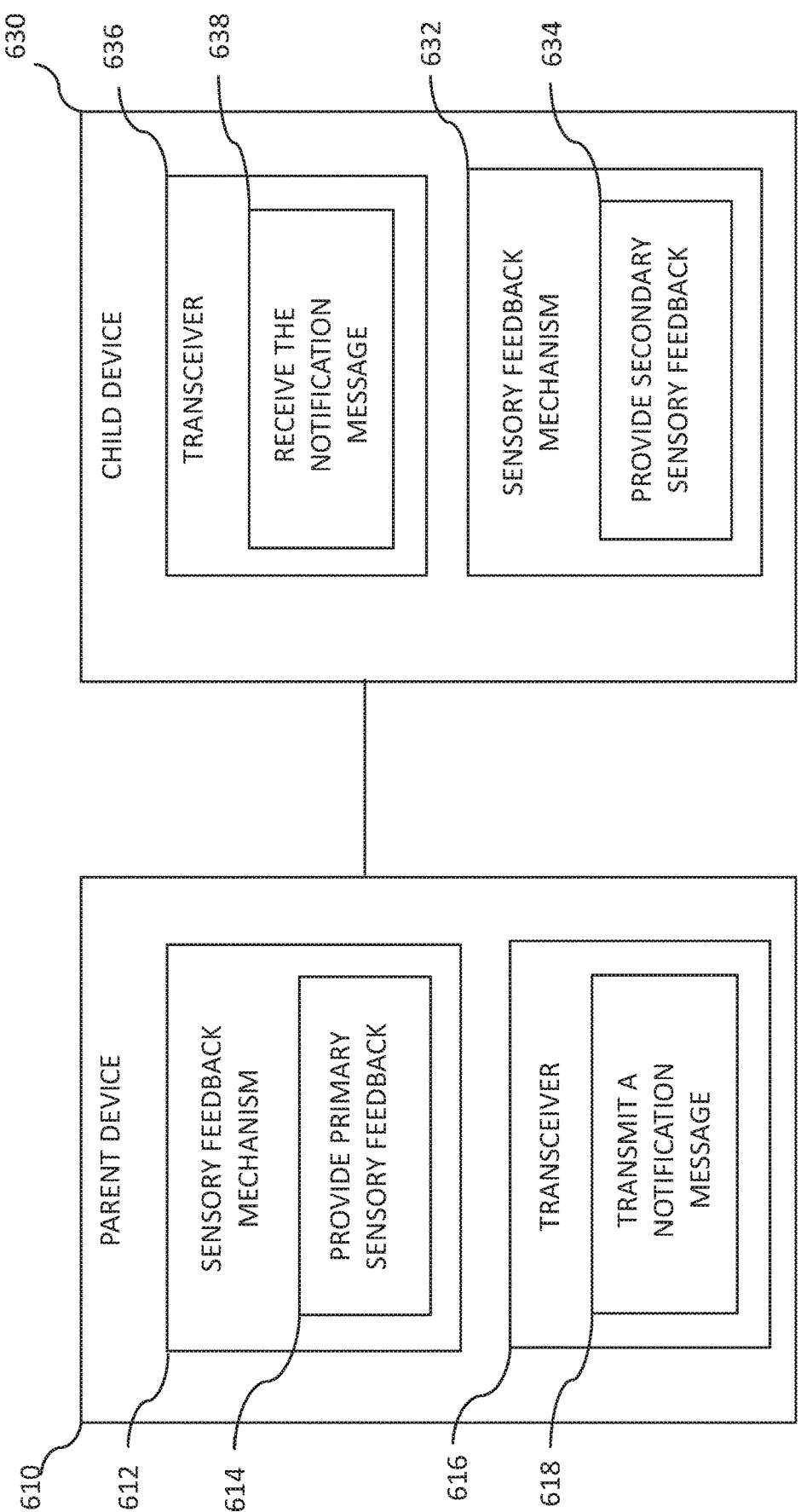
FIG. 6 illustrates an example of a sensory feedback system consistent with the disclosure.

FIG. 6 illustrates an example of a sensory feedback system consistent with the disclosure. As described herein, a parent device 610 may be coupled to a child device 630. For example, the parent device may comprise a sensory feedback mechanism 612 to provide primary sensory feedback 614 in response to detection parent device 610 and/or child device 630 is within a threshold distance of a designated boundary. As described herein, parent device 610 may comprise transceiver 616 to transmit a notification message 618 to the child device 630.

As described herein, child device 630 may comprise transceiver 636 to receive the notification message 638 from parent device 610. The notification message may contain instructions for the child device 630 to provide secondary sensory feedback. For example, child device 630 may comprise sensory feedback mechanism 632 to provide secondary sensory feedback to alert the VR user they are within the threshold distance of the designated boundary.

In some examples, the primary sensory feedback and the secondary sensory feedback may be synchronized. For example, parent device 610 may provide primary sensory feedback 614 at the same time as child device 630 provides secondary sensory feedback 634 by delaying initiation of the primary sensory feedback to coincide with an expected initiation of the second sensory feedback. In some examples, parent device 610 may initiate primary sensory feedback followed by child device 630 initiating secondary sensory feedback that overlaps the primary sensory feedback provided by the parent device. In some examples, child device 630 may initiate secondary sensory feedback followed by parent device 610 initiating primary sensory feedback overlapping the secondary sensory feedback provided by child device 630.

Figure 7:
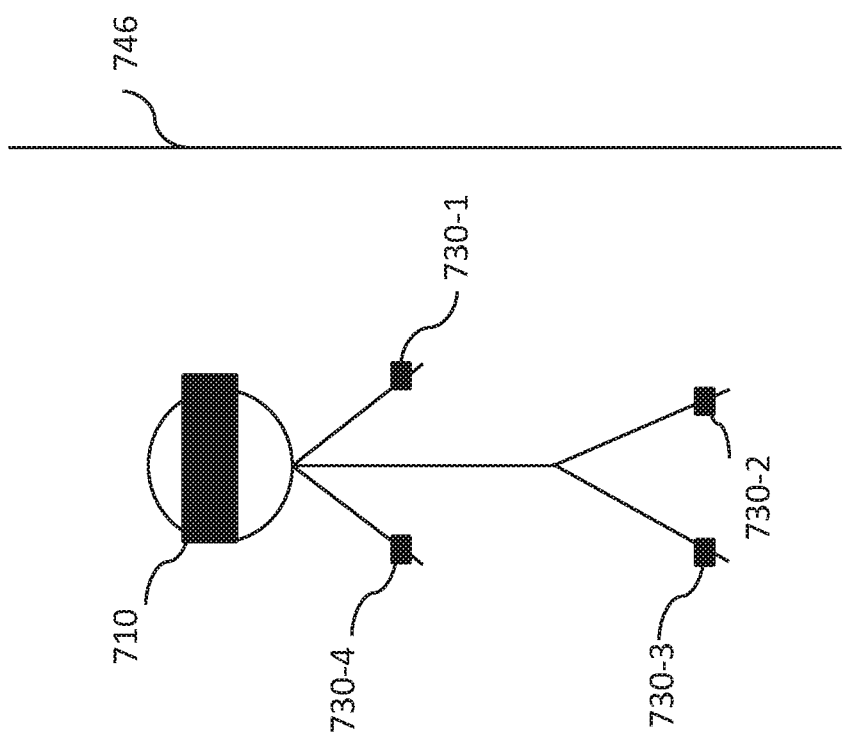
FIG. 7 illustrates an example of a sensory feedback system consistent with the disclosure.

FIG. 7 illustrates an example of a sensory feedback system consistent with the disclosure. As described herein, a VR user may wear a plurality of sensory feedback devices. As described herein a single sensory feedback device may be designated as the parent device 710 and each individual sensory feedback device not designated as the parent device may be designated as child devices 730-1, 730-2, 730-3, 730-4. The plurality of child devices 730-1, 730-2, 730-3, 730-4 may be coupled to the parent device 710. For example, the parent device 710 may communicate via a transceiver to each of the plurality of child devices 730-1, 730-2, 730-3, 730-4. While FIG. 7 illustrates a total of four child devices it is understood that a total number of child devices can be varied to include more or less child devices.

In some examples, the parent device 710 may transmit a notification message to the plurality of child devices 730-1, 730-2, 730-3, 730-4. For example, upon receipt of the notification message received from the parent device 710 notifying the plurality of child devices 730-1, 730-2, 730-3, 730-4 of a parent 710 and/or a child device 730-1, 730-2, 730-3, 730-4 being within a threshold distance of a designated boundary 746, the VR user may be alerted via synchronized primary sensory feedback and secondary sensory feedback. For example, each of the plurality of child devices 730-1, 730-2, 730-3, 730-4 and the parent device 710 may alert the VR user via visual feedback, audible feedback, haptic feedback, or combinations thereof.

As described herein, the parent device 710 and/or the plurality of child devices 730-1, 730-2, 730-3, 730-4 may provide two-dimensional information (e.g., left, right, front, back, etc.) to a VR user regarding the position of the VR user in relation to the designated boundary 746. For example, upon detection of the parent device 710 and/or the plurality of child devices 730-1, 730-2, 730-3, 730-4 being within a threshold distance of a designated boundary 746, the parent device 710 may provide primary sensory feedback to the portion of the VR user that is within the designated boundary 746.

In some examples, upon detection of parent device 710 and/or the plurality of child devices 730-1, 730-2, 730-3, 730-4 being within a threshold distance of a designated boundary 746, the parent device 710 may transmit a notification message to an individual or a plurality of child devices 730-1, 730-2, 730-3, 730-4 located on the portion of the VR user that is within the designated boundary.

For example, if the designated boundary 746 is to the right of the VR user, the parent device 710 and/or the plurality of child devices 730-1, 730-2, 730-3, 730-4 may provide sensory feedback via the parent device 710 and/or the plurality of child device 730-1, 730-2, 730-3, 730-4 to the right portion of the UR user (e.g., 730-1 and 730-2) to make the VR user aware of the unseen designated boundary to the right of VR user. In some examples, the parent device 710 and/or the plurality of child devices 746 may provide visual feedback via visual elements, such as flashing a light in the users peripheral vision (e.g., on the side the designated boundary 746 is located, etc.) or emitting an audible tone in an ear corresponding to a location of the designated boundary 746 with respect to the VR user (e.g., emitting an audible tone in the right ear of a user when a designated boundary 746 is located somewhere on the right side of the users view of the virtual environment, etc.).

In some examples, the secondary sensory feedback provided by a plurality of child devices 730-1, 730-2, 730-3, 730-4 located on a portion of the body corresponding to the location of the designated boundary 746 may be synchronized with the primary sensory feedback provided by the parent device 710. For example, the synchronized feedback may include primary sensory feedback provided by the parent device 710 at the same time as secondary sensory feedback is provided by a plurality of child devices 730-1, 730-2, 730-3, 730-4 located on a portion of the body corresponding to the location of the designated boundary by delaying initiation of the primary sensory feedback to coincide with an expected initiation of the secondary sensory feedback.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A non-transitory machine-readable medium storing instructions executable by a processing resource of a virtual reality (VR) headset to:
   cause the virtual reality (VR) headset to provide primary sensory feedback;
   transmit a notification message from the virtual reality (VR) headset to a child device to cause:
      the child device to provide secondary sensory feedback in response to receipt of the notification message, wherein the notification message includes instructions to provide secondary sensory feedback synchronized with the primary sensory feedback by delaying initiation of the primary sensory feedback to coincide with an expected initiation of the secondary sensory feedback, wherein the child device includes smart watches, clothing, game controllers, phones, VR controllers, audio headphones, headsets, or combinations thereof.

2. The medium of claim 1, further comprising instructions to transmit the notification message in response to detecting the VR headset is within the threshold distance of the designated boundary.

3. The medium of claim 2, wherein the designated boundary is a virtual boundary.

4. The medium of claim 1, wherein the virtual reality (VR) headset includes a sensory feedback device.

5. The medium of claim 1, wherein the synchronized feedback includes the primary sensory feedback provided at the same time as the secondary sensory feedback.

6. The medium of claim 1, wherein the sensory feedback includes visual feedback, audible feedback, haptic feedback, or combinations thereof.

7. A virtual reality (VR) headset, comprising:
   a sensory feedback mechanism to provide primary sensory feedback; and
   a transceiver to:
      transmit a notification message to the child device in response to detecting the virtual reality (VR) headset is within a threshold distance of a designated boundary, wherein the notification message includes instructions to cause a sensory feedback mechanism of a child device to provide secondary sensory feedback that is synchronized with the primary sensory feedback by delaying initiation of the primary sensory feedback to coincide with an expected initiation of the secondary sensory feedback, wherein the child device includes smart watches, clothing, game controllers, phones, VR controllers, audio headphones, headsets, or combinations thereof.

8. The parent device of claim 7, wherein the transceiver receives a notification message indicating the virtual reality (VR) headset is within the threshold distance of the designated boundary.

9. A child device, comprising:
   a transceiver to receive a notification message from a virtual reality (VR) headset, wherein the notification message includes instructions to provide secondary sensory feedback and to provide a propagation delay between initiation of primary sensory feedback provided by the VR headset and the secondary sensory feedback; and
   a sensory feedback mechanism to provide the secondary sensory feedback in response to receipt of the notification message, wherein the secondary sensory feedback is synchronized with the primary sensory feedback by delaying the initiation of the primary sensory feedback to coincide with an expected initiation of the secondary sensory feedback, wherein the child device includes smart watches, clothing, game controllers, phones, VR controllers, audio headphones, headsets or combinations thereof.

10. The child device of claim 9, wherein the propagation delay is a length of time it takes for the notification message to travel from the virtual reality (VR) headset to the child device.

11. The child device of claim 9, wherein a magnitude of the primary sensory feedback and a magnitude of the secondary sensory feedback are proportional to the virtual reality (VR) headset's distance from a designated boundary.

12. The child device of claim 9, wherein the child device is coupled to a plurality of second child devices, and wherein each child device of the plurality of child devices provides a distinct secondary sensory feedback.

* * * * *